United States Patent
Best et al.

(10) Patent No.: US 6,517,786 B1
(45) Date of Patent: Feb. 11, 2003

(54) DEVICE AND METHOD FOR DECOMPOSING HARMFUL SUBSTANCES CONTAINED IN FLUE GAS

(75) Inventors: Walter Best, Dueren (DE); Johannes Peter Franziskus Conrads, Juelich (DE); Wolf-Dieter Franke, Greifswald (DE); Siegfried Mueller, Greifswald (DE); Wolfgang Reich, Greifswald (DE)

(73) Assignee: Institute fuer Niedertemperatur-Plasmaphysik E. V. An der Ernst-Moritz-Arndt-Universitaet Greifswald, Greifswald (DE)

( * ) Notice: Subject to any disclaimer, the term of this patent is extended or adjusted under 35 U.S.C. 154(b) by 0 days.

(21) Appl. No.: 09/403,533
(22) PCT Filed: Apr. 23, 1998
(86) PCT No.: PCT/EP98/02394
§ 371 (c)(1), (2), (4) Date: Jan. 10, 2000
(87) PCT Pub. No.: WO98/48922
PCT Pub. Date: Nov. 5, 1998

(30) Foreign Application Priority Data

Apr. 28, 1997 (DE) .......................................... 197 17 890
Apr. 28, 1997 (DE) .......................................... 197 17 889

(51) Int. Cl.[7] ............................................... B01J 19/08
(52) U.S. Cl. ................... 422/186.04; 588/227; 204/164
(58) Field of Search .................... 422/186.04; 204/164; 588/227

(56) References Cited

U.S. PATENT DOCUMENTS

4,954,320 A    9/1990   Birmingham et al.

FOREIGN PATENT DOCUMENTS

| DE | 3708508 | 9/1988 |
|---|---|---|
| DE | 4231581 | 3/1994 |
| DE | 4302465 | 3/1994 |
| DE | 4416676 | 11/1995 |
| DE | 19525749 | 1/1997 |
| DE | 19525754 | 1/1997 |
| DE | 19534950 | 3/1997 |
| EP | 0366876 | 5/1990 |
| GB | 2 274 412 A  * | 7/1994 |

OTHER PUBLICATIONS

Jan. 1, 1991 Soot Oxidation in a Silent Discharge, Azuchi Harano, Masayoshi Sadakata, and Masayuki Sato, Journal of Chemical Engineering of Japan vol. 24 pp. 100–106.

* cited by examiner

*Primary Examiner*—Kishor Mayekar
(74) *Attorney, Agent, or Firm*—Jordan and Hamburg LLP

(57) ABSTRACT

A decomposition device and a method for decomposing gases with soot or other harmful substances has a processing station using dielectrically hindered discharge. The device has at least two electrodes, one of which is a porous and gas permeable electrode. In order to decompose the gas containing harmful substances, the gas is first introduced into a processing station in which the gas is subjected to plasma processing involving an alternate voltage supply, and from which the gas is let out. The gas is introduced through one end of the processing station formed by the two electrodes.

28 Claims, 7 Drawing Sheets

DEVICE AND METHOD FOR DECOMPOSING HARMFUL SUBSTANCES CONTAINED IN FLUE GAS

This application is a §35 U.S.C. 371 National Stage filing of PCT/EP98/02394 published as WO 98/98992 on Nov. 5, 1998.

BACKGROUND OF THE INVENTION

The invention relates to an apparatus and a method for decomposing pollutants in waste gases of combustion processes.

These include, for example, poisonous pollutants, such as $NO_x$ in waste gases from combustion processes, particularly in exhaust gases of vehicles or stationary engines and in flue gases of power plants, operated with fossil fuels.

A different area of use of the invention is the decomposition of soot-containing pollutants in waste gases of combustion process, particularly in exhaust gases of diesel vehicles or of stationary engines.

Aside from the traditional method for eliminating poisonous and soot-containing pollutants from combustion processes, it has also already been proposed that these waste gases be treated in a dielectrically hindered discharge.

The phenomenon of the dielectrically hindered discharge, frequently also referred to as silent discharge or alternating voltage discharge between insulated electrodes has long been known. This form of discharge is distinguished owing to the fact that it can be carried out at normal pressure and at overpressures. The pressure range for carrying out such discharges extends from a few 10 mbar up to a few bar and tie distance between the electrodes lies between 0.1 mm and a few mm. Dielectrically hindered discharges are characterized owing to the fact that at least one dielectric is disposed between the electrodes or on one of the electrode. The discharge is conducted with alternating voltages ranging from a few Hz to several 100 kHz. In the case of electrodes having a large surface area, numerous, randomly distributed, small discharge threads, also referred to as filaments, are formed. Due to the insulation, the discharge after the breakdown is limited automatically and the duration of the discharge generally amounts only to fractions of the duration of the half period. As a result, the heating of the gas by the plasma is not worth mentioning.

It is furthermore known that chemical compounds can be produced or destroyed with such plasmas. Contributions to this subject are contained, for example in: "Proceedings of the NATO Advanced Research Workshop on Non-Thermal Techniques for Pollution Control", Cambridge, September 1992, published by B. Penetrante and S. Schultheis, "Non-Thermal Plasma Techniques for Pollution Control", Springer Verlag Berlin 1993.

In technical solutions, the dieletrically hindered discharge is part of a plasma reactor. As a rule, the reactor is a large capacity structure and, since the electrode area of the dielectrically hindered discharge can be scaled at will, a structure with a large surface area, so that large flows can also be treated. The shaping is either planar or coaxial. A corresponding apparatus is described, for example, in the Gennan Offenlegungsschrift 37 08 508.

It has also been proposed, for example, in the German Offenlegungsschrift 195 25 754 A1 and the German Offenlegungsschrift 195 25 749 A1 to divide the reactor volume into spatially periodic structures, so that, in the flow direction, discharge zones and discharge-free zones are formed. At the same time, in the region of the discharge zones, the shaping has means for raising the field. Furthermore, provisions are made in the Germnan Offenlegungsschrift 195 25 749 A1, to introduce chemically effective materials in the region of the surfaces of the structures.

In the German Offenlegungsscrift 195 34 950 A1, a reactor is described, which consists of several modules with a plurality of parallel channels, spatially separated from one another in a dielectric body, in which electrodes are mounted.

A further version for the construction of a dielectrically hindered discharge has been proposed in the German patent 43 02 465 C1. For this, at least one electrode consists of a voltage-stimulated plasma.

A different possible reactor construction is disclosed in the U.S. Pat. No. 4,954,320. The apparatus contains metallic electrodes, between which a loose accumulation of dielectric insulating bodies, such as ceramic spheres, are accommodated. The apparatus of the German Offenlegungsschrift 44 16 676 A1 represents a similar variation, for which the space between the plate-shaped electrodes is filled with insulators, the whole cross section of which is traversed by channels or contains pores.

In order to influence the course of the chemical reactions in the plasma, it has also been proposed that certain additives be supplied to the waste gas that is to be treated. For example, in the German 42 31 581 A1, an inlet for admixtures is assigned to an apparatus for purifying waste gases.

In the state of the art, the stream of waste gases flows through the discharge space along the electrode surfaces, which extend parallel to one another. It enters at one end of the discharge space, formed by the two electrodes, and emerges at the other end, and does so also independently of whether or not an accumulation of insulators has been introduced between the electrodes. The residence time of the waste gas in the plasma treatment space corresponds to the controlled or uncontrolled amount flowing and to the flow velocity, which arises from the cross-sectional area of the treatment space. For physical reasons, the distance between the electrodes can be increased only to a limited extent. The flow velocity for an optimum treatment can therefore be decreased only, if the transverse extent of the discharge space can be increased greatly or if there is a plurality of parallel connections of such discharge spaces, which results in a large overall volume. This furthermore brings about an increased energy consumption as well as a decrease in the effectiveness of the purification process with respect to course of the chemical reactions. In addition, further reactions can thus be initiated, as a result of which other harmful substances or undesirable by-products are formed. Furthermore, in equipment constructed according to the state of the art, the treatment of waste gases containing soot must be continued, until the soot particles have been converted completely to $CO_2$ and CO or are otherwise bound. If the load, the flow velocity or the amount of soot in the waste gas changes, the length must be such that decomposition is complete even in the most unfavorable case. Under practical conditions, an inappropriately long treatment space would be required and, moreover, the effectiveness of the purification process for other polluting components would be decreased due to the unnecessarily long duration of the treatment. Furthermore, the energy consumption would also be increased as a result.

SUMMARY OF THE INVENTION

It is therefore an object of the invention to provide an apparatus and a method for the apparatus, by means of which the decomposition of pollutants, especially of $No_x$ and soot, from waste gases is improved. At the same time, economical and safe operation should be made possible in the case of all operationally related fluctuations in the soot content in the waste gas that is to be treated.

The porous electrode is arranged along the direction of flow. According to the invention, the waste gas is passed into a treatment space, which is constructed according to the principle of the dielectrically hindered discharge, at least one of the electrodes, forming this treatment space, being porous and electrically conductive and the waste gas flowing through his porous electrode. The porous electrode is configured so that it is permeable to the gaseous components, but acts as a filter for the soot particles, restraining these.

It has proven to be advantageous for the apparatus of the present invention that, with the passing of the waste gas stream through the porous electrode surface, there is a quieting of the gas stream, since the electrode surface is always larger than the cross-sectional area of the discharge space or the cross-sectional area of the flow conduit, so that the flow velocity in the region of the porous electrode is drastically decreased and an effective treatment can thus take place. Furthermore, a compact construction of the apparatus becomes possible and the use of energy is decreased. It is furthermore advantageous that, independently of the different soot contents of the waste gas, emission of the soot to the surrounding atmosphere is avoided. Furthermore, due to the decomposition of soot in the plasma, neither a high temperature of the waste gas nor a device for heating is required, in order to cause the carbon to react. As a further advantage, it has been observed that constituents, set free by the decomposition of poisonous components of the waste gas, such as $No_x$ is bound by the carbon and an autoxidation of other, undesirable intermediate products is limited in this way. Through the use of a porous electrode in the treatment space, it is furthermore achieved that other harmful by-products of the waste gas, especially in the form of aerosols, are largely retained and decomposed.

For the associated method, the waste gas stream, which is to be treated, is passed into one of the spaces constructed pursuant to the invention and a plasma treatment of the waste gas takes place before the latter flows through the electrode wall into one or several adjacent spaces. The adjacent space, in turn, can be also be designed as a configuration for operating a dielectrically hindered discharge, in which a further decomposition of the intermediate products, formed in a first treatment space, takes place. The treatment optionally may be continued in further, adjacent spaces. It is advantageous that, in this way, a treatment of the waste gases can take place stepwise and complex reactions of the starting materials with the decomposition products are thus limited in this manner. In this way, the porous electrode can also be used once or several times for quieting the gas stream.

The invention is to be described in greater detail by means of examples. Examples 1a to 3 relate to an inventive apparatus and to the method of decomposing poisonous pollutants in waste gases. Examples 4 to 6 show an apparatus and the method for decomposing soot-containing pollutants in waste gases of combustion. In the drawings,

DETAILED DESCRIPTION OF THE INVENTION

Figure 1A:
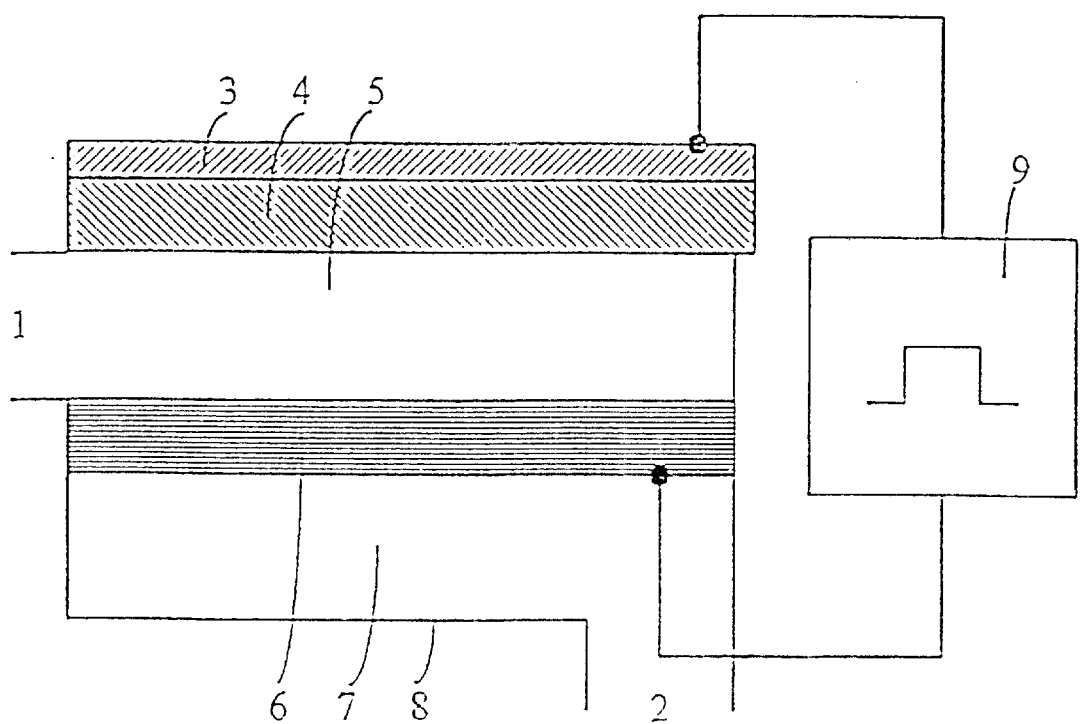
FIG. 1a shows the diagrammatic construction of an apparatus with a porous electrode.

FIG. 1a illustrates the principal construction of an apparatus diagrammatically. It has a gas inlet 1 and a gas outlet 2, it being possible to exchange the gas inlet and outlet without changing the principle of the present invention. An insulated electrode is formed from an electrically conductive material 3 and an insulating material 4 on the electrode. Opposite this, a porous electrode 6 is disposed, which is electrically conductive. Between these electrodes, a gas space is formed as a treatment space 5, in which a gas discharge can be produced by applying an alternating voltage to the electrodes from an alternating voltage supply 9. The apparatus is bounded by a housing 8. A gas space 7, for accommodating the gases supplied or treated, is formed between the housing 8 and the porous electrode 6. The gas stream is passed through the apparatus so formed, particularly through the porous electrode 6, and experiences a quieting there during the passage.

Figure 1B:
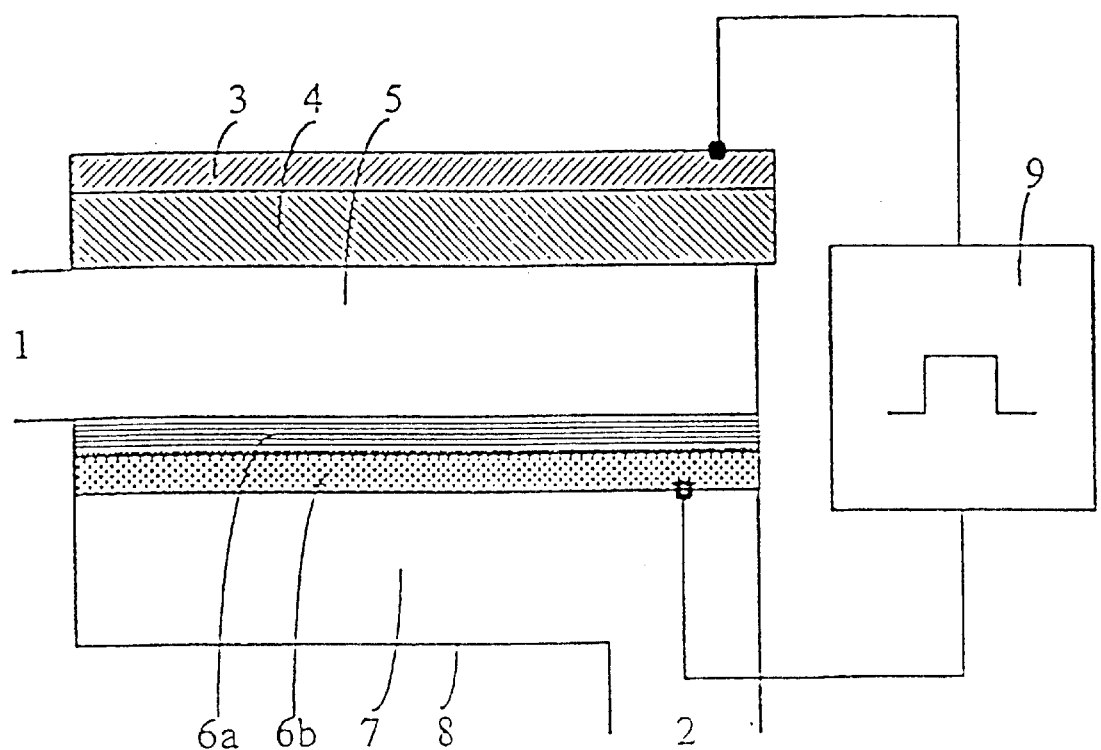
FIG. 1b shows the diagrammatic construction of an apparatus with a porous electrode consisting of two parts.

However, an electrically non-conductive material can also be used in place of the electrically conductive porous electrode 6. In this case, the porous electrode 6 must be constructed as an insulated electrode configuration, which consists of two components. Such a case is illustrated in FIG. 1b. With otherwise a similar construction of the apparatus as before, the porous electrode 6 consists of an electrically non-conducting layer 6a and an electrically conducting layer 6b, to which one side of the alternating voltage supply 9 can be connected. Moreover, the electrically non-conducting layer 6a is disposed on the side of the treatment space 5 and the electrically conducting layer 6b is disposed on the side of the gas space 7. Together with the insulated electrode, consisting of electrically conductive material 3 and insulating material 4, a dielectrically hindered discharge, also known as dielectric barrier discharge, Configuration with two insulated electrodes is formed in this way.

With such an arrangement and in a different construction, it is also possible to do without the insulating material 4, so that the dielectrically hindered discharge can be formed between the electrically conductive material 3 and the porous electrode 6, formed of the electrically non-conducting layer 6a and electrically conducting layer 6b. The different layers, i.e. electrically non-conducting layer 6a and electrically conducting layer 6b of the porous electrode may consist, for example, of differently doped SiC. It is, however, not absolutely essential to form the electrically conducting layer 6b of a porous material. The electrically conducting layer 6b may also consists of a non-porous material, which has a lattice or perforated structure, so that the gas can pass though there without being impeded.

To support the course of plasma-chemical reactions, the porous electrode 6 can also be infiltrated with a material with catalytic activity, the porosity having to be retained for the inventive use.

Figure 2:
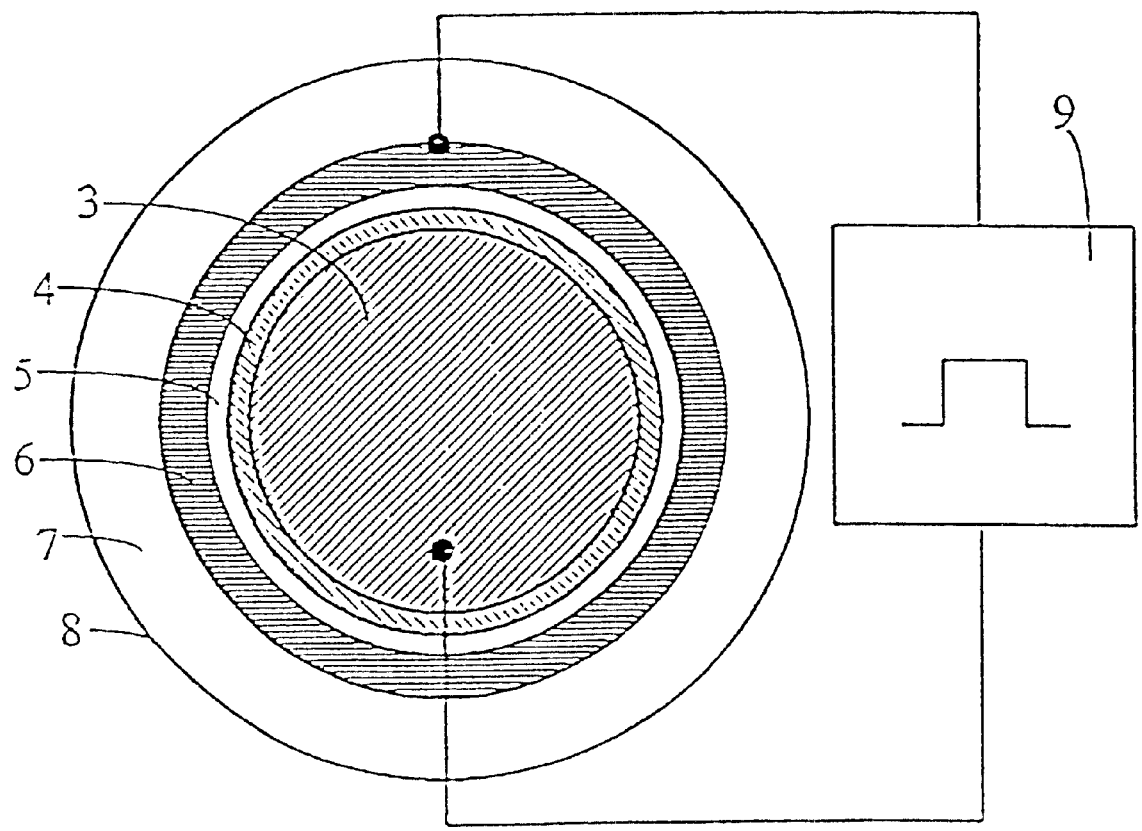
FIG. 2 shows the section through the coaxial construction of the apparatus.

In FIG. 2, the section through a coaxial construction of an apparatus is shown, in which an electrically conducting material 3 and an insulating material 4 together form a coaxial, cylindrical, insulated electrode. This cylindrical, insulated electrode is surrounded by a tube of a porous material with electrically conducting properties, which serves as a counter electrode. By means of a spacer, the details of which have not been drawn, a gas space is fixed between the two electrodes as a treatment space 5, in which a gas discharge can be produced. A housing 8 closes the arrangement with a gas space 7 for accommodating and distributing the gas. In one method, especially when there are no particles, such as dust or soot, in the waste gas to be treated, the latter is supplied over the gas space 7 through a suitable gas inlet, which is not shown here. The gas then flows through the porous electrode 6 into the treatment space 5, in which a plasma treatment takes place. The plasma treatment once again is brought about once again by an alternating voltage supply 9. Towards the outside, the treatment space is supplied with a suitable gas outlet, through which the treated gas can be discharged.

However, without changing the principle of the present invention, the gas can also be supplied over the treatment space 5. in which then first of all a plasma treatment takes place. At the same time, the gas is discharged through the porous electrode 6. The gas is supplied either over both ends of the treatment space 5 or over one end, the treatment space 5 then being closed off in some suitable manner at the end opposite the gas inlet, so that untreated gas does not emerge there.

The basic shape of the electrodes is furthermore of no consequence for the inventive use. For example, the shape of the electrode may be square, rectangular or otherwise or electrodes of different shape may also be combined, the principle described being retained.

For certain applications, it is advantageous to provide the waste gas additionally with liquid or gaseous admixtures. For this purpose, suitable inlets for the admixture of gaseous or liquid substances to the waste gas can be assigned to the treatment space 5 and/or the gas space 7. It may also be of advantage, if the apparatus is equipped with a cooling system. For this purpose, the electrically conductive material 3, in a variation of an example, the details of which are not shown, is constructed as a tube, through which a suitable coolant flows. Instead of a liquid or gaseous coolant, a heat pipe can also be used in a suitable manner.

The longitudinal extent of the apparatus depends on the volume and flow rate of the waste gas, which is to be treated. For use of the present invention, there is only one feature, which is essential, namely that the length be selected so that the resulting surface area of the porous electrode is larger than the cross sectional area of the treatment space 5, so that the gas stream is quieted suitably. This condition is already fulfilled if the length is greater than the thickness of the gas space. Preferably, the length is greater than the thickness of the gas space by a factor of ten or more.

The thickness of the gas space of the treatment space 5 corresponds to the state of the art. For the wall thickness of the porous electrode 6, 0.5 mm to 5 mm are preferred, and other thicknesses also are possible. The pore diameter of porous material from which the porous electrode is formed preferably ranges from 3 $\mu$m to 200 $\mu$m. However, other diameters can also be selected. It is furthermore possible to operate the apparatuses described above with several constructions with parallel flow, in order to achieve a high gas throughput.

Figure 3:
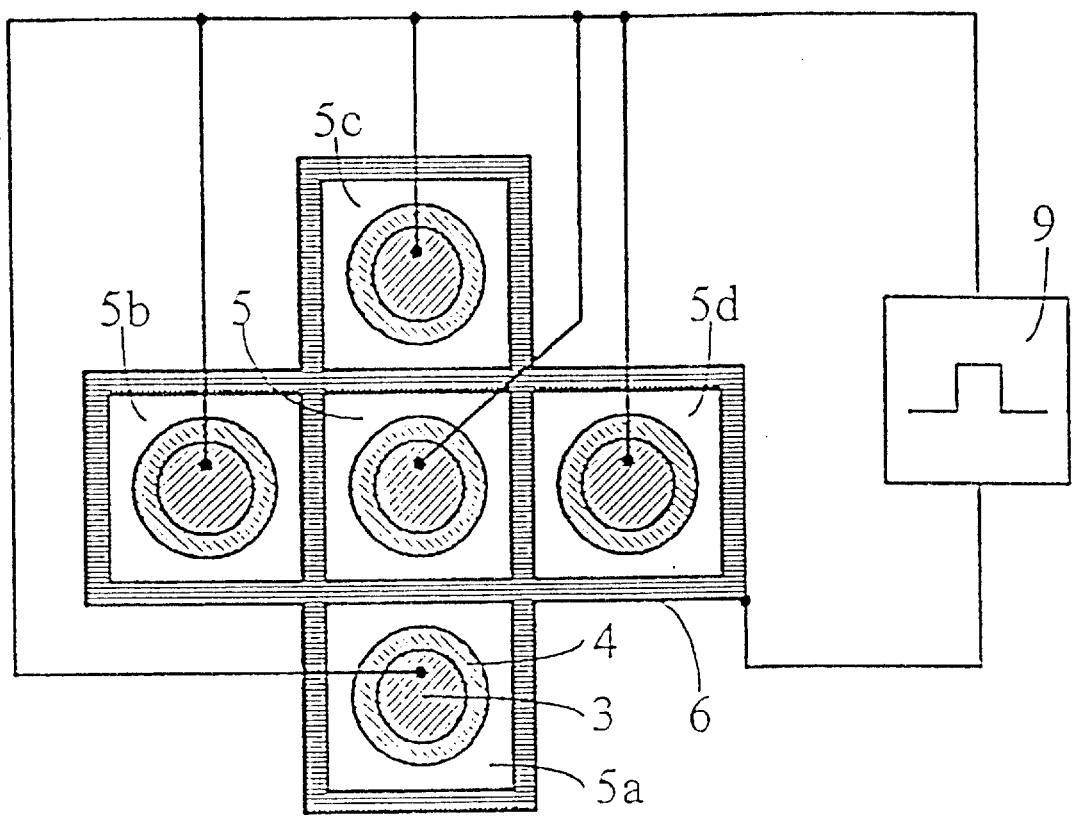
FIG. 3 shows the section through an apparatus with several reaction spaces.

The gas space 7, present in the previously described examples, can advantageously be replaced by a reaction space, so that a further plasma treatment can be carried out in this space. FIG. 3 shows a corresponding example of the apparatus for carrying out the inventive method. In the case of this apparatus, a plasma treatment with several reaction spaces takes place. A section through such an apparatus is shown. For this arrangement, the porous electrode 6 is constructed as a combined honeycomb structure of five rectangular honeycomb parts in the form of rectangular hollow cuboids, two adjoining side surfaces of which form a common wall. Insulated electrodes having electrically conductive material 3 and insulating material 4 are introduced into these hollow cuboids. In FIG. 3, coaxial constructions of the insulated electrodes in the form of cylindrical rods are shown. Between the insulated electrodes consisting of electrically conductive material 3 and insulating material 4, and the porous electrode 6 forming several chambers, several gas spaces, which in this case serve as treatment spaces 5a, 5b, 5c and 5d, are formed by spacers, the details of which are not shown. The electrodes of the apparatus once again are connected with an alternating voltage supply 9.

In FIG. 3, the insulated electrodes with the components electrically conductive material 3 and insulating material 4 are shown at only one honeycomb part, since the others are similarly constructed and this repeats itself correspondingly. In the version of FIG. 3, the honeycomb structure of the porous electrode is arranged, so that a central hollow cuboid is formed, at the side surface of which the four adjacent ones adjoin.

In accordance with the method, the waste gas is passed into the space, which is formed in the central honeycomb and which is configured as a treatment space 5. The gas is exposed here to a first plasma treatment and flows through the porous electrode wall into the adjacent honeycombs with their similarly present treatment spaces 5a, 5b, 5c and 5d, in which a second treatment takes place. The gas, treated in the second step, flows through the respective treatment space and over the other three walls to the outside, where it is emitted over a housing, the details of which are not shown, and a suitable gas outlet to the surroundings. For guiding the flow, the central treatment space 5 is closed at one end and the gas flows in from the other end, or the gas flows in from both ends and then through the side walls into the adjacent treatment spaces. The adjacent treatment spaces 5a, 5b, 5c and 5d for the second treatment can, in turn, be closed off at both ends, so that the gas is discharged through their other three walls. It is also possible for the treatment spaces 5a, 5b, 5c and 5d to be open at one or both ends, so that the treated gas flows out through these open ends.

By means of the arrangement described by FIG. 3, the waste gas is treated twice. However, an equally advantageous multiple quieting of the gas stream takes place whenever the latter enters and leaves the porous electrode wall. Furthermore, it has proven to be advantageous that the high pressure peaks are lowered in the second treatment section.

Further variations can be realized without thereby changing the character of the invention. For example, further treatment spaces can be disposed about the five treatment spaces constructed pursuant to the invention for the apparatus described previously by FIG. 3. A treatment takes place in these further treatment spaces or the gas emerges to the outside through them. In this case, the gas flows through several treatment spaces, which are disposed next to one another, and through several porous electrode walls. For larger gas throughputs, several constructions, which have been described, can once again be connected with parallel flow. Moreover, different sequences between several inflowing and outflowing treatment spaces can be selected in that once again a honeycomb structure is formed and each second honeycomb serves as an inflowing treatment space, while the respectively adjacent ones serve as outflowing treatment spaces. From line to line, this principle can be shifted by one functional unit.

Figure 4:
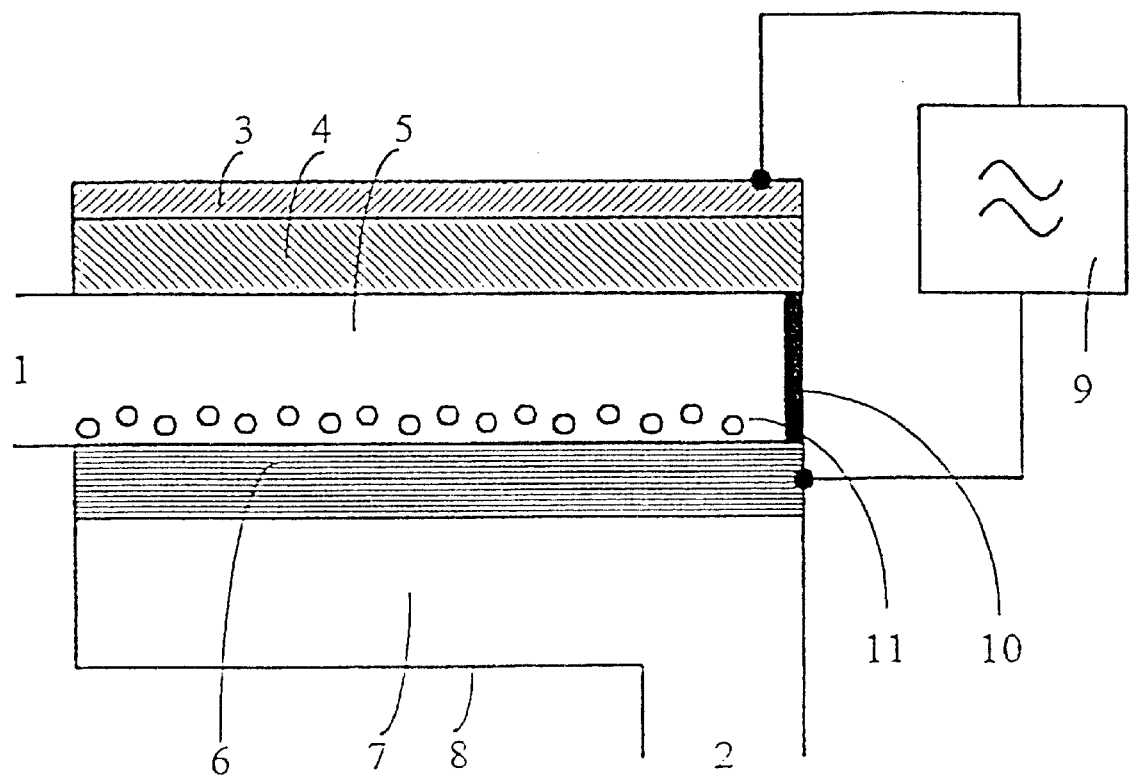
FIG. 4 shows the principle of the apparatus diagrammatically.

FIG. 4 illustrates diagrammatically the basic construction of an apparatus intended for the inventive apparatus in the event that the waste gases are laden with soot. An insulated electrode is formed by an electrically conducting material 3 and an insulating material 4 located thereon. Disposed opposite to this is a porous electrode 6, which preferably is electrically conducting and consists, for example, of a reaction-bound silicon carbide. Between these electrodes, a treatment space 5 is formed, in which, when an alternating voltage is applied to the electrodes by an alternating voltage supply 9, a gas discharge can be produced. The apparatus is bounded by a housing 8 and has a gas inlet 1, a gas outlet 2 and a seal 10 at one end of the treatment space 5. Between the housing 8 and the porous electrode 6, the gas space 7 is constructed for accommodating and passing on the treated gas into the gas outlet 2.

The gas stream is passed through the apparatus thus formed, especially through the porous electrode 6. On passing through this electrode, the waste gas stream is quieted and the soot particles, in particular, are retained. By bringing about a gas discharge with the alternating voltage supply 9, the carbon is caused to react in the plasma, so that it is oxidized. Depending on the particle content of the porous electrode, the gas discharge can also be controlled. By means of a suitable sensor, such as a pressure-measuring device, the state is ascertained and the alternating voltage supply 9 is switched on or off correspondingly or the pulse duty factor of the alternating voltage is changed. In the event that the waste gas stream does not contain sufficient oxygen or that the proportion of oxygen from the decomposition products is inadequate, air from the surroundings can also be mixed with the waste gas stream, in that a suitable device for admixing is assigned to the gas inlet 1.

Instead of the porous electrode 6, formed from an electrically conducting material, it is also possible to use an electrically non-conducting material. In this case, the porous electrode 6 must be constructed as an insulated electrode configuration, which is composed of two components. The configuration of the insulated electrode, consisting of electrically conductive material 3 and insulating material 4, can be similar to that of the other electrode, since the discharge is limited by the porous, non-conducting part of the electrodes.

Figure 5:
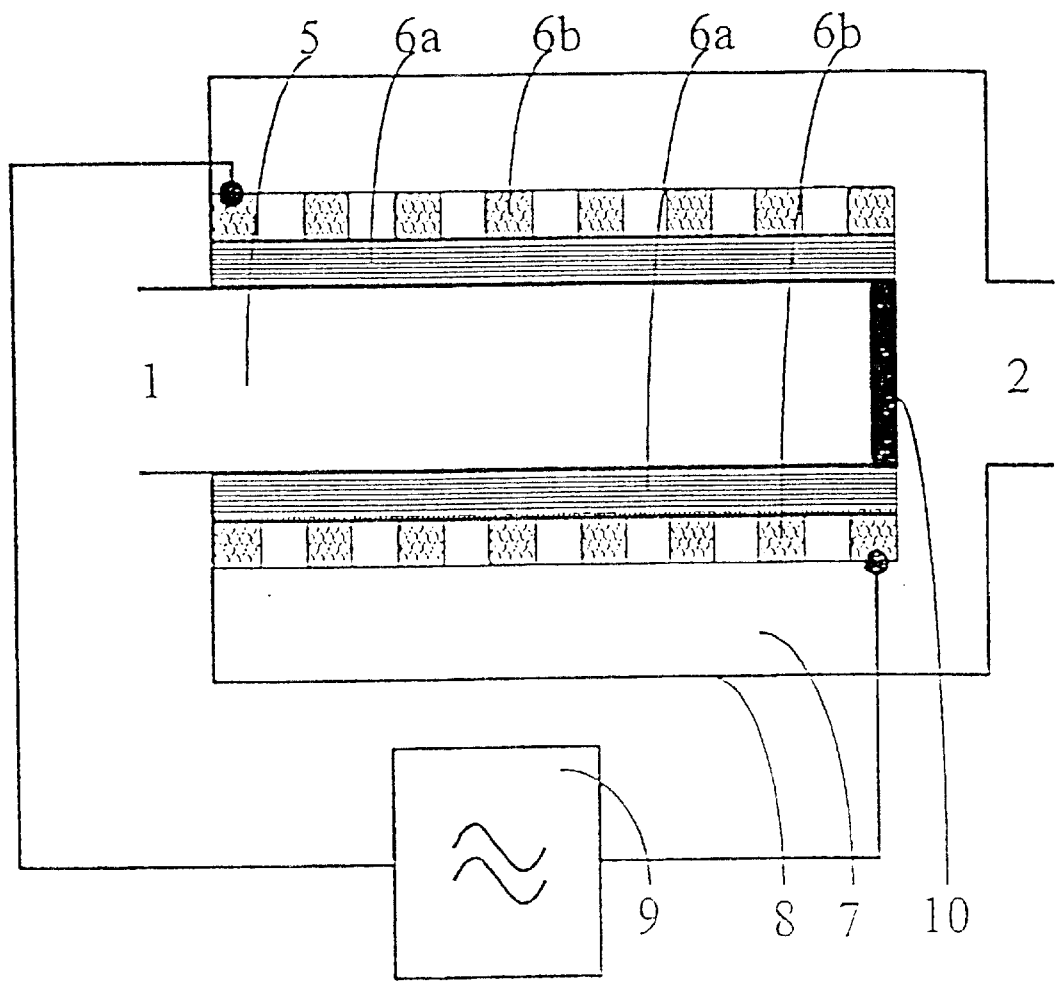
FIG. 5 shows the diagrammatic construction with a porous electrode consisting of two parts.

An apparatus of such a construction is shown diagrammatically in FIG. 5. The porous electrode consists of an electrically non-conducting layer 6a and of a braiding of an electrically conducting layer 6b. The electrically conducting layer 6b can also be constructed in the form of a sieve or otherwise be provided with openings. The only important feature is that passage to the gas is guaranteed. The electrodes, similarly constructed in this example, are disposed opposite one another, the treatment space 5 being formed between them. The electrically non-conducting layer 6a is disposed on the side of the treatment space 5 and the electrically conducting layer 6b is disposed on the side of the gas space 7. In this way, a dielectrically hindered discharge configuration with two similar, insulated electrodes is formed, through which the previously treated waste gas from the treatment space 5 can flow into the gas space 7 formed by a housing 5 and, over a gas outlet 2, into the surrounding air.

The previously described two-part electrode can also be constructed from a porous, electrically non-conducting layer 6a and an electrically conducting layer 6b, also with porous properties, without changing the character of the invention. The different components, electrically non-conducting layer 6a and electrically conducting layer 6b of the porous electrode can, for example, be differently doped SiC.

When using a porous electrode, which is constructed as an insulated electrode configuration, in a different version, it is also possible to do without the insulating material 4, so that the dielectrically hindered discharge between the electrically conductive material 3 and the porous electrode, formed from the components electrically non-conducting layer 6a and electrically conducting layer 6b, can also be effected.

To support the plasma-chemical reactions, it is also possible to include the temperature in an optimization of the course of the reactions, by equipping an apparatus with a suitable cooling system or conversely with a device for heating.

In shaping the treatment space, planar or coaxial forms of electrodes can be opposite one another, or both forms can also advantageously be combined.

Figure 6:
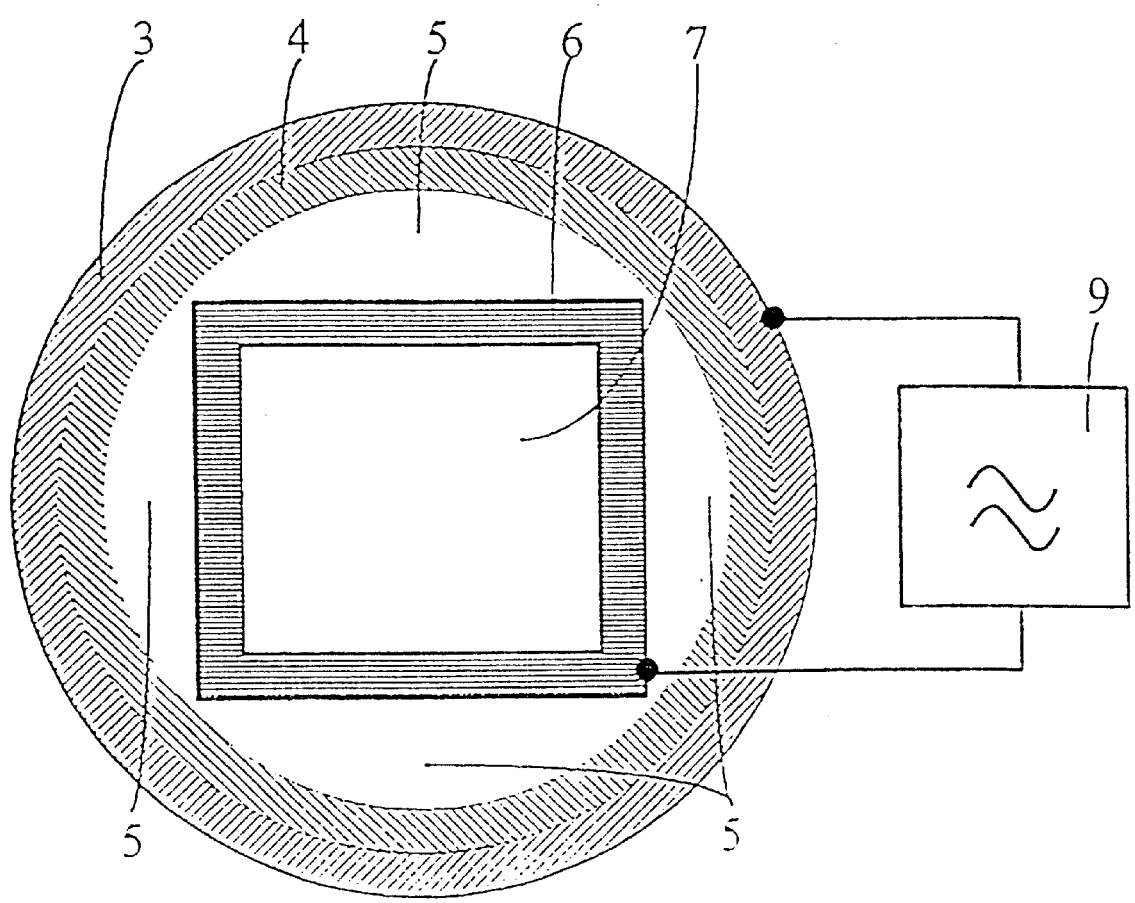
FIG. 6 shows the section through a construction with electrodes of different shape.

In FIG. 6, a section through another embodiment of the apparatus is shown. In this apparatus, an electrically conductive material 3 and an insulating material 4 together form a coaxial, insulated electrode. The porous electrode 6, formed as a hollow cuboid, is introduced into this insulated electrode, which is formed as a tube.

A treatment space 5, which is divided into four parts in this example and the gas space thickness of which varies corresponding to the coaxial shape and the planar shape of the two electrodes, is formed once again by the two electrodes. Due to this special shaping of the electrodes, it is achieved, on the one hand, that the voltages for igniting the discharge are lower, since very small gas space thicknesses are also present, which have a lower voltage requirement and, after the ignition, support the ignition in the other discharge segments by so-called conditioning effects. On the other hand, the gap width of the discharge space at many places is wide enough, in order to prevent blockage of the treatment space 5, which is divided into four parts. The variation shown does not require any spacers between the electrodes, since the cuboid fits into the tube. In the event that the cuboid is smaller, suitable spacers once again must be mounted between the electrodes.

The gas to be treated is supplied over one end or both ends of the treatment space 5 by a suitable gas supplying device, which is not shown here. In the case that gas is supplied over one end, the other end is closed off once again in a suitable manner. After the treatment, the gas flows through the porous electrode 6 into the gas space 7 and is emitted to the surrounding atmosphere there by way of an appropriate gas outlet.

The variation of FIG. 6 can once again be modified with the previously described distinguishing features of variations of the embodiment and/or of the supplementary features mentioned.

As a further advantageous embodiment, the details of which are not shown here, the gas space 7 of the examples described above can be configured so that a plasma treatment can also be carried out in it so that, as a result, an after-treatment of the previously treated waste gas is carried out. For this purpose, an insulated electrode configuration is mounted in the gas space 7 and fixed with suitable spacers.

A further treatment space is then formed between this insulated electrode and the porous electrode 6. Together with the first treatment space 5, which was described in the examples above, a multiple treatment of the waste gas is thus possible.

The geometric dimensions of the reactor configuration should be adapted to the volume and to the soot content of the waste gas, which is to be treated. At large gas throughputs, the apparatuses described above can be operated with several constructions with parallel flow.

Values, corresponding to the state of the art, are selected for the thicknesses of the gas space of the treatment space 5. The wall thickness of the porous electrode preferably falls within the range from 0.5 mm to 5 mm. However, other thickness are also possible. The pore diameter of the porous material preferably is chosen to be between 3 μm and 200 μm, but may also have other values.

What is claimed is:

1. An apparatus for decomposing pollutants in waste gas from combustion processes comprising:
   a member defining at least one treatment space having a gas inlet for passing the waste gas in a direction of flow; and
   a porous electrode and at least one other electrode configured to work according to the principle of the dielectrically hindered discharge, said porous electrode being configured such that the waste gas escapes from the at least one treatment space through the porous electrode which is porous and permeable to gas for this purpose, wherein the porous electrode, which either is conductive or includes a porous, non-conducting component and a conducting component, is constructed to be permeable to gases and to act as a filter for soot particles and the porous electrode is disposed along the direction of flow of the waste gas that is to be treated and has an area which is larger than a cross-sectional area of the at least one treatment space at the gas inlet.

2. The apparatus of claim 1, wherein the porous electrode includes reaction-bound SiC.

3. The apparatus of claim 1, wherein the porous electrode has a braiding of an electrically conducting material.

4. The apparatus of claim 1, wherein the porous electrode is infiltrated with a material which has catalytic properties.

5. The apparatus according to claim 1, wherein a gas space is provided through which the waste gas passes after passing through the at least one treatment space and the porous electrode, and a volume of the gas space is greater than a volume of the at least one treatment space.

6. The apparatus according to claim 1, wherein not all surface elements of the porous electrode and the at least one other electrode are disposed parallel to one another, so that different thicknesses of gas space are formed therewith at a section of the at least one treatment space.

7. The apparatus of claim 1 wherein the porous electrode comprises SiC.

8. The apparatus of claim 1 wherein the porous electrode comprises a material having catalytic activity.

9. The apparatus of claim 1 wherein the porous electrode includes an electrically non-conducting component.

10. A method for decomposing pollutants in waste gas of combustion processes, comprising:
    flowing the waste gas flows along a porous electrode in at least one treatment space,
    subjecting the waste gas in the at least one treatment space to a plasma treatment performed by dielectrically hindered discharge of the porous electrode by a suitable alternating voltage supply, and
    filtering soot as the waste gas flows through the porous electrode by deposition of the soot on a surface of the porous electrode wherein the waste gas flows through the porous electrode into a gas space or into a further treatment space.

11. The method of claim 10, wherein the soot particles are filtered out by deposition on the porous electrode from the waste gas and are caused to react by a plasma, the plasma being switched on or off depending on a concentration of the soot particles so that a minimum concentration of the soot particles is retained.

12. The method of claim 10, wherein, relative to the at least one treatment space, a reduced pressure is produced in the gas space on a discharge side.

13. The method of claim 10, or 11, further comprising the step of adding admixed components to the waste gas in one of the gas space and the further treatment space to decompose the pollutants in the waste gas in a reaction.

14. The method for decomposing pollutants in waste gas according to claim 10 further comprising the step of providing cooling to support plasma-chemical reactions of the waste gas.

15. The method for decomposing pollutants in waste gas according to claim 10 further comprising the step of providing heating to support plasma-chemical reactions of the waste gas.

16. The method for decomposing pollutants in waste gas according to claim 10 further comprising the step of passing the waste gas to a further treatment space prior to discharging the waste gas to the gas space.

17. An apparatus for decomposing pollutants, including soot, in waste gas from combustion processes, comprising:
    a housing including a treatment space having a gas inlet and a gas outlet, wherein the waste gas entering at the gas inlet defines an input flow direction;
    an electrode extending in said housing substantially along said input flow direction;
    a porous electrode opposing said electrode and extending in said housing substantially along said input flow direction to define said treatment space between said electrode and said porous electrode, and said porous electrode having a surface area facing said treatment space which is greater than a cross-sectional area of said treatment space at said gas inlet;
    said housing including an outlet space on an opposing side of said porous electrode from said treatment space, said porous electrode being porous such that soot particles are filter from the waste gas passing through said porous electrode from said treatment space to said outlet space by deposition on a surface of said porous electrode; and
    a power source configured to drive said electrode and said porous electrode to plasma treat and decompose said soot particles deposited on said porous electrode by effecting dielectric barrier discharge.

18. The apparatus of claim 17, wherein the porous electrode includes reaction-bound SiC.

19. The apparatus according to claim 17, wherein said outlet space has a volume greater than a volume of the treatment space.

20. The apparatus according to claim 17, wherein at least portions of said porous electrode and said electrode are disposed non-parallel to one another, so that a varying width of gas space is formed at at least a section of the treatment space.

21. The apparatus of claim 17 wherein the porous electrode comprises a material having catalytic activity.

22. The apparatus of claim 17 wherein the porous electrode includes a porous electrically non-conducting material and a conductive material.

23. The apparatus of claim 17 wherein the porous electrode includes a porous electrically conductive material.

24. A method for decomposing pollutants, including soot particles, in waste gas of combustion processes, comprising the steps of:

flowing the waste gas flows along an inlet surface of a porous electrode communicated with at least one treatment space;

subjecting the waste gas in the at least one treatment space to a plasma and dielectric barrier discharge of the porous electrode by a suitable alternating voltage supply; and passing the waste gas through the porous electrode and out a discharge side of the porous filter to filter the soot particles by deposition of the soot particles on the surface of the porous electrode.

25. The method of claim 24, wherein the soot particles react with the plasma, the method further comprising switching the plasma on and off depending on a concentration of the soot particles so that a minimum concentration of the soot particles is retained.

26. The method of claim 24, wherein, relative to the treatment space, a reduced pressure is produced in a gas space on said discharge side of said porous electrode.

27. The method of claim 24 or 25, further comprising adding admixed components to the waste gas to decompose the pollutants in the waste gas in a reaction.

28. The method for decomposing pollutants in waste gas according to claim 24 further comprising the step of heating the waste gas.

* * * * *